(12) United States Patent
Levenson

(10) Patent No.: US 10,616,035 B1
(45) Date of Patent: Apr. 7, 2020

(54) METHODS AND APPARATUS FOR DEVICE CHAT AND MANAGEMENT

(71) Applicant: EMC IP Holding Company LLC, Hopkinton, MA (US)

(72) Inventor: Myron Myles Levenson, Southborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 15/883,463

(22) Filed: Jan. 30, 2018

(51) Int. Cl.
*H04L 12/24* (2006.01)
*H04L 29/12* (2006.01)
*H04L 12/58* (2006.01)

(52) U.S. Cl.
CPC ........ *H04L 41/026* (2013.01); *H04L 41/0803* (2013.01); *H04L 51/046* (2013.01); *H04L 51/12* (2013.01); *H04L 61/2069* (2013.01)

(58) Field of Classification Search
CPC . H04L 41/026; H04L 41/0803; H04L 51/046; H04L 51/12; H04L 61/2069
USPC ........................................................ 709/223
See application file for complete search history.

(56) References Cited

U.S. PATENT DOCUMENTS

| | | | |
|---|---|---|---|
| 9,117,199 B2 * | 8/2015 | Peters | G06Q 10/101 |
| 9,338,026 B2 * | 5/2016 | Bandini | H04L 51/12 |
| 10,412,190 B1 * | 9/2019 | Roche | H04L 67/42 |
| 2005/0234850 A1 * | 10/2005 | Buchheit | G06Q 10/10 |
| 2014/0115080 A1 * | 4/2014 | Pignataro | H04L 41/0266 709/206 |
| 2014/0258488 A1 * | 9/2014 | Jain | H04L 51/046 709/223 |
| 2017/0019390 A1 * | 1/2017 | Gu | H04L 63/08 |
| 2017/0041263 A1 * | 2/2017 | Shekel | H04L 51/12 |

(Continued)

FOREIGN PATENT DOCUMENTS

| | | | | |
|---|---|---|---|---|
| CN | 101141698 B | * | 8/2010 | |
| CN | 103731802 A | * | 4/2014 | |
| WO | WO-2013091316 A1 | * | 6/2013 | ............... H04W 4/14 |

OTHER PUBLICATIONS

"ThingWorx Industrial Innovation Platform", downloaded from https://www.ptc.com/en/products/iot/thingworx-platform Dec. 19, 2017.

(Continued)

*Primary Examiner* — Davoud A Zand
(74) *Attorney, Agent, or Firm* — Ryan, Mason & Lewis, LLP

(57) ABSTRACT

Methods and apparatus are provided for device chat and management. One method comprises: obtaining a message at a device chat broker for management of a state of a recipient device using a person-to-person chat framework; and providing, by the device chat broker, the message to the recipient device, wherein the recipient device is registered with the device chat broker. The recipient device registers with a device management system as a device of a particular device type using a Device Type Repository storing attributes of the particular device type. The recipient device optionally communicates with a person using the person-to-person chat framework based on a remote session attribute. The remote session attribute optionally has associated predefined conversations and/or sequences of predefined question and answer pairs.

20 Claims, 6 Drawing Sheets

(56) References Cited

U.S. PATENT DOCUMENTS

2018/0083836 A1* 3/2018 Kuo ..................... H04L 12/281

OTHER PUBLICATIONS

"An Overview of XMPP", XMPP Standards Foundation (XSF), https://web.archive.org/web/20171019135938/http://xmpp.org/about/technology-overview.html, Archived on Oct. 19, 2017.

* cited by examiner

METHODS AND APPARATUS FOR DEVICE CHAT AND MANAGEMENT

FIELD

The field relates generally to techniques for managing devices and communications among devices.

BACKGROUND

Device configuration and management was historically performed locally at each device. Devices are increasingly designed to permit device settings to be remotely configured and updated, often in an automated manner over a network connection. In an enterprise setting, for example, device management tools are often employed to monitor, configure and manage devices over an enterprise network.

Existing device management tools, however, typically have rigid and manual onboarding procedures and communication patterns that increase the cost and effort required for device management. Device enhancements, such as new software releases, and device maintenance often require lengthy communication negotiations and additional costs.

A need therefore exists for improved techniques for managing devices and communications among devices.

SUMMARY

In some embodiments, methods and apparatus are provided for device chat and management. An exemplary method comprises: obtaining a message at a device chat broker for management of a state of a recipient device using a person-to-person chat framework; and providing, by the device chat broker, the message to the recipient device, wherein the recipient device is registered with the device chat broker. The recipient device registers with a device management system as a device of a particular device type using a Device Type Repository storing attributes of the particular device type.

In one or more embodiments, the recipient device communicates with at least one person, such as a support person, using the person-to-person chat framework based on a remote session attribute. The remote session attribute optionally has associated predefined conversations and/or sequences of predefined question and answer pairs for a given predefined conversation.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods and apparatus for device chat and management.

In one or more embodiments, the disclosed device chat techniques employ a person-to-person chat framework, such as an open source framework similar to a Skype framework, for device communication and management. In some embodiments, a device type profile for a particular device type can be provided by support personnel, for example, using a manual onboarding process, and/or by a particular device, as discussed further below in conjunction with FIG. 2, and then additional devices of the same device type can be onboarded using automated techniques. The person-to-person chat framework may be implemented, for example, using the Extensible Messaging and Presence Protocol (XMPP), comprising a set of open technologies for instant messaging (IM), presence, multi-party chat, collaboration, voice and video calls, and routing of XML data.

In some embodiments, devices are registered with a device chat broker, for example, using a chat-based registration process, and the device chat broker forwards one or more messages for management of a state of a given device to the given device using the person-to-person chat framework. The devices may comprise, for example, mobile telephones, laptop computers, tablet computers, desktop computers, sensors (e.g., Internet of Things (IoT) sensors) or other types of devices capable of providing access to network resources.

In one or more embodiments, the management of the state of a given device may comprise, for example, management messages indicating that a device should: (i) reboot itself; (ii) send a message containing its current configuration; (iii) adjust a temperature or another device parameter; and/or (iv) push new encryption keys.

Figure 1:
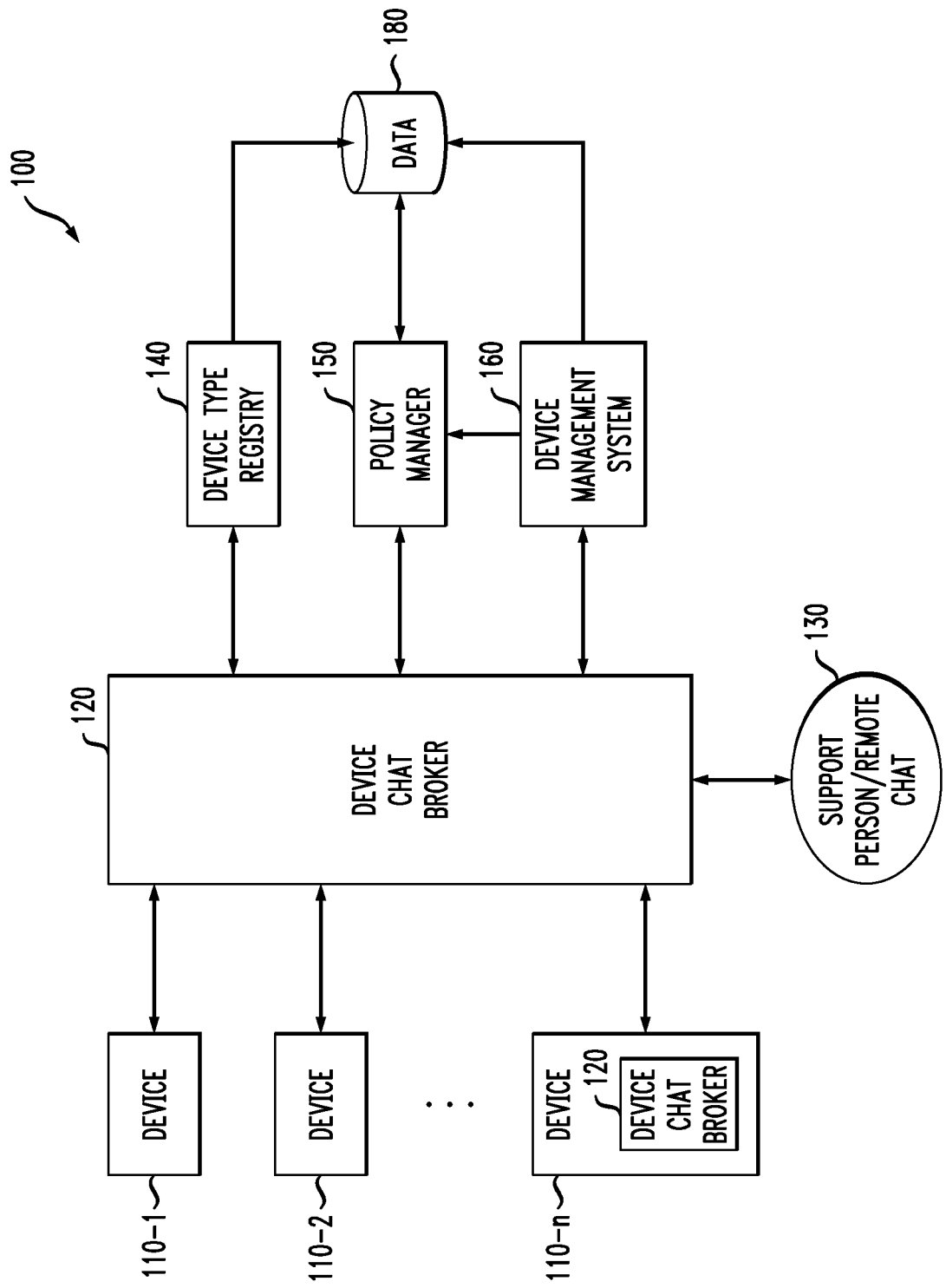
FIG. 1 illustrates an exemplary device chat environment, according to an embodiment.

FIG. 1 illustrates an exemplary device chat environment 100, according to an embodiment. As shown in FIG. 1, the exemplary device chat environment 100 comprises a plurality of devices 110-1 through 110-n that communicate with one another using a device chat broker 120, as discussed further below in conjunction with FIG. 3, for device-to-device chat. The various devices 110 may be located, for example, at customer locations. In addition, a support person 130 can optionally chat with one or more of the devices 110 using a remote chat feature, as discussed further below in conjunction with FIGS. 4 and 5, for person-to-device chat.

A device type registry 140 and device management system 160 are used to register and manage the devices 110, respectively, as discussed further below in conjunction with FIG. 2. Generally, a given device 110 can employ the device chat techniques described herein to describe itself to the device type registry 140, for example, when the given device 110 is adding itself to the device management system 160. The provided device description describes the attributes of the given device 110 that can be manipulated or recorded by the device management system 160. The exemplary device management system 160 stores metadata about attributes of a device type. Alternatively, a description can be manually authored and provided directly to the device type registry 140. Each attribute description includes the name of the attribute, its data type and allowed values. In this manner, the devices 110 can be understood before they are managed.

The exemplary device chat broker 120 may be implemented, for example, as an XMPP broker. In some embodiments, the exemplary device chat broker 120 serves as a middleman for device chats (e.g., for messages originating in a particular device 110 or the device management system 160).

When a device 110 adds itself to the device management system 160, the device management system 160 adds the device 110 to its contact list. In addition, the device management system 160 optionally welcomes the device 110 and returns a key, a possible chatroom name and a "from address" for device-to-device management system 160 communications, as discussed further below in conjunction with FIG. 2. If the possible chatroom name is not a Null value, then the device 110 joins the indicated chat room.

The device management system 160 can then broadcast management messages to all the devices 110 in its contact list, or to individual devices 110. Devices 110 can also broadcast messages to all other devices 110 in the chat room for device-to-group chat, so that data may be synchronized between the devices 110. Typically, the chat room would be a device group, and all devices in the chat room would have one or more shared device attributes, location, enterprise affiliation, and/or ownership.

The device management system 160 optionally records an online/offline status of each managed device 110, for example, when signaled by the underlying chat framework. In this manner, each device 110 in a particular chat room can subscribe to presence of other devices 110 in the chat room and be aware of the offline/online status of all group members.

A policy manager 150 provides policy management and enforcement whereby messages are filtered through the policy manager 150 to allow or prohibit the messages based on one or more predefined policies.

The device type registry 140, policy manager 150 and device management system 160 may comprise a backend system, for example, in an enterprise that collectively provides and accesses device-related data in a database 180.

As shown in FIG. 1, one or more devices 110 optionally embed a device chat broker 120 for use by child devices 110.

One or more components in the FIG. 1 embodiment, such as device chat broker 120, are assumed to be implemented using at least one processing device. Each such processing device generally comprises at least one processor and an associated memory, and implements one or more functional modules for controlling certain features of the exemplary device chat broker 120.

More particularly, the exemplary device chat broker 120 is an embodiment of a server type software program that manages, for example, connections to devices and people, chat sessions, chatrooms, user accounts and offline/online notifications. In this embodiment, the exemplary device chat broker 120 is implemented using a processor coupled to a memory and a network interface, as discussed further below in conjunction with FIG. 8. The processor illustratively comprises a microprocessor, a microcontroller, an application-specific integrated circuit (ASIC), a field-programmable gate array (FPGA) or other type of processing circuitry, as well as portions or combinations of such circuitry elements. The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

Articles of manufacture comprising such processor-readable storage media are considered embodiments of the present disclosure. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The device type registry 140, policy manager 150 and device management system 160 in some embodiments comprise respective computers, processing devices and/or server devices associated with a particular company, organization or other enterprise. Numerous other operating scenarios involving a wide variety of different types and arrangements of processing devices and networks are possible, as will be appreciated by those skilled in the art.

The exemplary device chat broker 120 may connect to one or more of the devices 110, device type registry 140, policy manager 150 and device management system 160, for example, using at least a portion of one or more of a global computer network, such as the Internet, a wide area network (WAN), an "enterprise network," a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using IP or other related communication protocols. Numerous other operating scenarios involving a wide variety of different types and arrangements of processing devices and networks are possible, as will be appreciated by those skilled in the art.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The storage destinations associated with the database 180 may include at least one storage device comprising stored files and/or objects. Although database 180 may comprise multiple distinct storage devices, it will be used in subsequent description herein to refer to a single storage device. The storage device is coupled to a network and to the exemplary device management system 160, for example. The storage device in the present embodiment is implemented using one or more storage systems associated with the device management system 160. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The storage device can illustratively comprise a single storage array, storage disk, storage drive or other type of storage device. Alternatively, the storage device can comprise one or more storage systems each having multiple storage devices implemented therein. The term "storage device" as used herein is therefore intended to be broadly construed. In some embodiments, a storage device may comprise a network share or possibly even an attached device such as a USB stick. The stored files on the storage device may already be encrypted using an encryption process implemented to protect the stored files from unauthorized access.

Although shown as separate from the device management system 160 in FIG. 1, the exemplary device type registry 140 in other embodiments can optionally be implemented at least in part internally to the device management system 160. Accordingly, the exemplary device type registry 140 can be implemented externally to the device management system 160, as illustrated in the figure, or at least in part internally to the device management system 160.

In some embodiments, the exemplary device type registry 140 is co-located with the device management system 160, for example, within a particular data center or other facility of a given enterprise. Alternatively, the exemplary device type registry 140 may be implemented in cloud infrastructure that is remote from the device management system 160.

Figure 2:
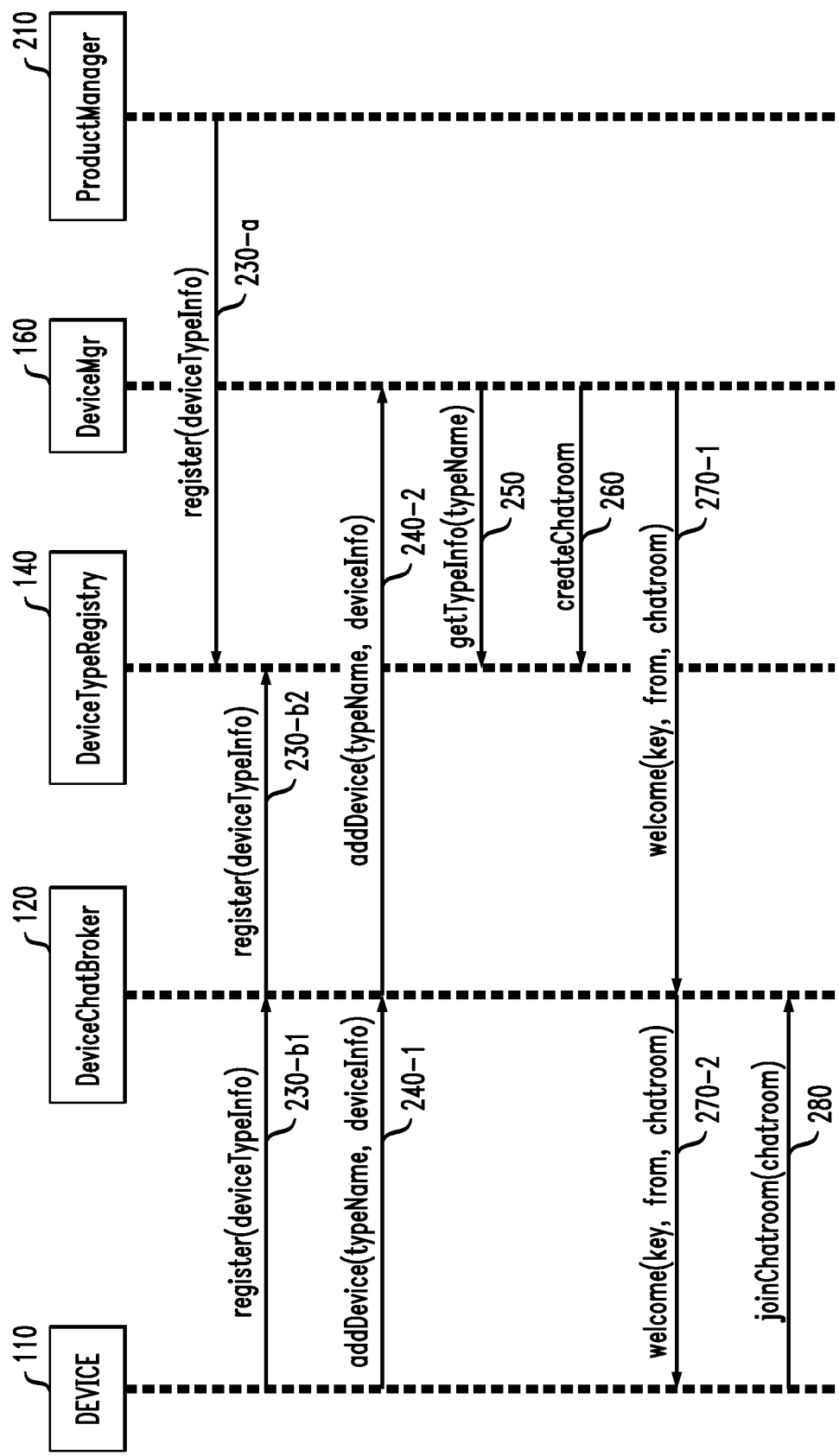
FIG. 2 is an exemplary communications diagram for a device type registration and device add process, according to some embodiments.

FIG. 2 is an exemplary communications diagram 200 for a device type registration and device add process, according to some embodiments. As shown in FIG. 2, a register device type communication 230 is sent to the device type registry 140 identifying attributes of the particular device type and data types. In various embodiments, the register device type communication 230 can comprise (i) a communication 230-a sent by a product manager 210 (e.g., a human associated with a particular enterprise); and/or (ii) a communication 230-b1 and 230-b2 sent by a particular device 110 to the device type registry 140, via the device chat broker 120. Once the device type has been established in the device type registry 140, devices of the same device type can then be automatically added with the device manager 140.

As shown in FIG. 2, the device 110 can then send an add device request 240-1, 240-2 to the device management system 160, via the device chat broker 120, to be added as a device of the specified device type (and thereby inherit the attributes or metadata registered for this device type). In the example of FIG. 2, the exemplary add device request 240 identifies the name of the device type, as well as information specific to the device 110, such as an optional device identifier (e.g., a serial number) and/or network communication address.

In response to the received add device request 240, the device management system 160 sends a get-type-information request 250 to the device type registry 140 to obtain the attributes of the specified device type (e.g., by type name). In addition, the device management system 160 optionally sends a create chat room message 260 to the device type registry 140 to create a chat room, if needed, for the specified device type.

The device management system 160 optionally sends a welcome message 270-1, 270-2 to the device 110, via the device chat broker 120, for example, comprising a security key, a "from address" for communications between the device and the device management system 160, and possibly a chatroom name. The chatroom name may be derived, for example, from the device type information and/or or device information. If the possible chatroom name is not a Null value, the device 110 optionally joins the indicated chat room using a join chat room request 280.

Figure 3:
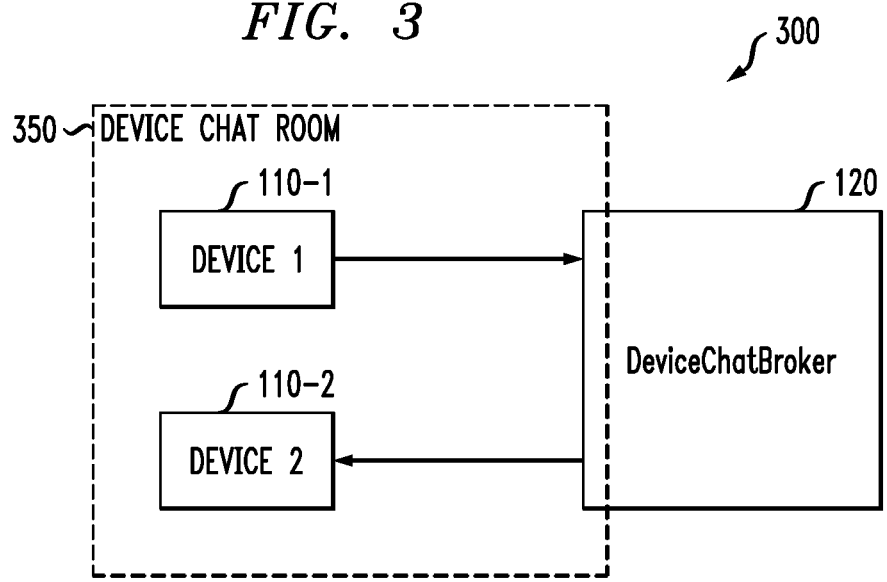
FIG. 3 illustrates a device-to-device chat process, according to one embodiment.

FIG. 3 illustrates a device-to-device chat process 300, according to some embodiments. As noted above, devices 110 can chat through the device chat broker 120. In the example of FIG. 3, a first device 110-1 sends a chat message to device 110-2 through the device chat broker 120. The device chat broker 120 has already registered both devices 110 and knows how to deliver a message to device 110-2.

Figure 4:
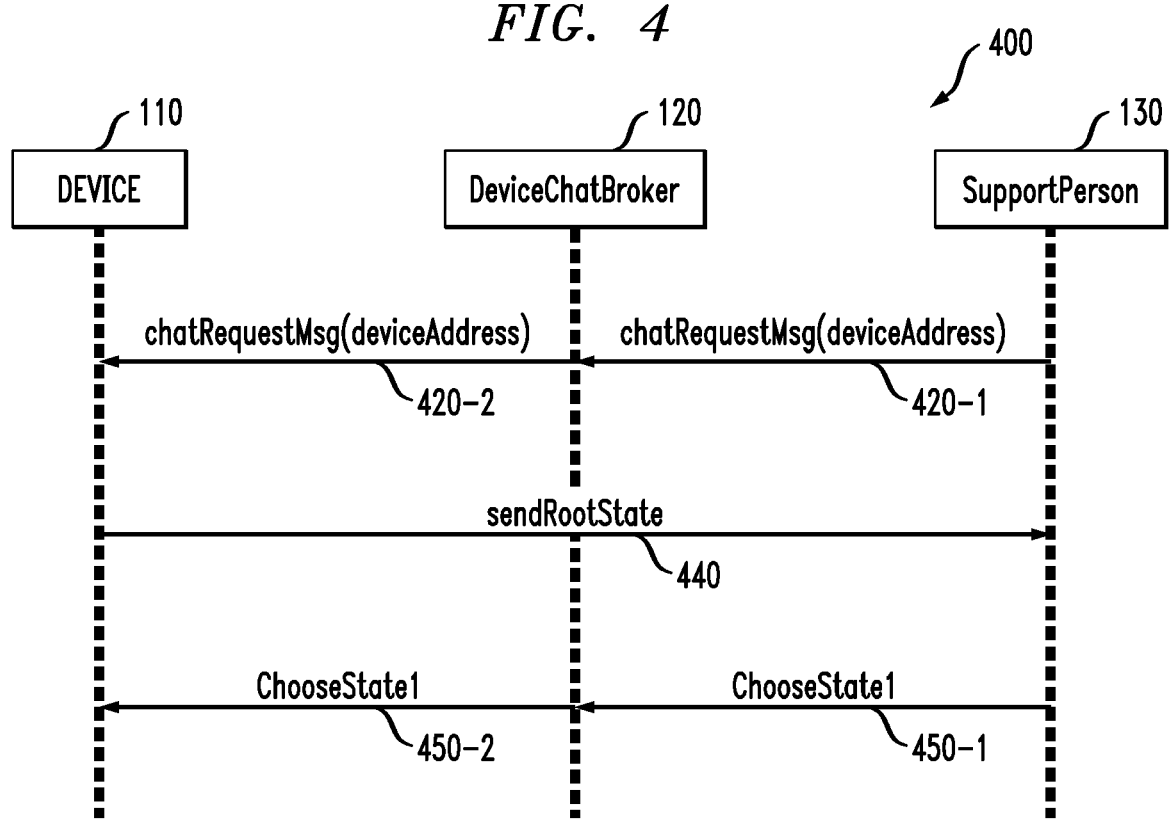
FIG. 4 is an exemplary communications diagram for a remote chat session between a support person and a device, according to an embodiment.

FIG. 4 is an exemplary communications diagram 400 for a remote chat session between a support person 130 and a device 110, according to one embodiment. As shown in FIG. 4, the support person 130 provides a chat request message 420-1, 420-2 to the particular device 110, identified by the device address in the chat request message 420, via the device chat broker 120. The device chat broker 120 forwards the chat request message 420-2 to the particular device 110 identified in the chat request 420. In one or more embodiments, the chat request message 420 has the "from" address of the support person 130, as well as the "destination" address of the particular device 110 (e.g., sender and recipient identifiers).

Thereafter, the particular device 110 sends the root state 440 of one or more predefined available scripts available for the particular device 110, in some embodiments, to the support person 130, as discussed further below in conjunction with FIG. 5. The exemplary root state 440 corresponds to a predefined list of chat topics, that works in a similar manner as a menu-driven application.

The support person 130 then selects a state using the root state 440 and sends a choose state message 450-1, 450-2 to the particular device 110, via the device chat broker 120. The device chat broker 120 forwards the choose state message 450-2 to the particular device 110 to start the device chat.

In one or more embodiments, a particular device 110 can enable person-to-device remote chats with the particular device 110 by setting a remote session attribute in the metadata of the particular device 110. If the remote session attribute is set to true for the particular device 110, a person is allowed to chat with the device 110. A device type that allows person-to-device chat has an associated data structure that exposes a predefined list of conversations, and a sequence of question/answer pairs for each conversation it supports, as discussed hereinafter.

Figure 5:
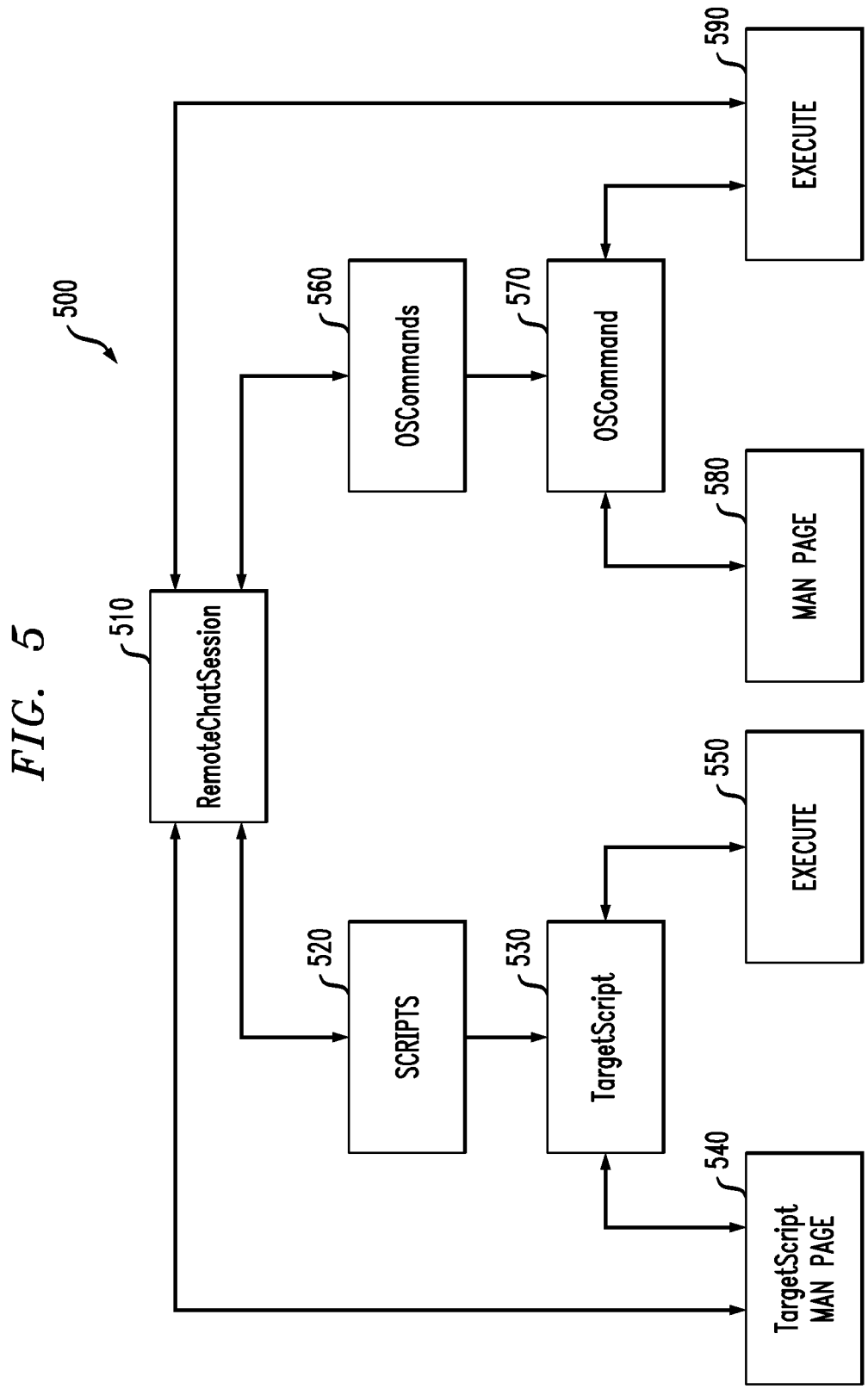
FIG. 5 illustrates an exemplary set of remote chat session states for device-to-person chats, according to an embodiment.

FIG. 5 illustrates an exemplary set of remote chat session states 500 for device-to-person chats, according to an embodiment. The exemplary remote chat operates in a similar manner as a finite state machine having a tree of predefined states. As shown in FIG. 5, an exemplary remote chat session has a root state 510 (e.g., comprising a list of top level topics) that allows the human to select script topics 520 or operating system (OS) commands 560 for a device chat with a particular device 110. The exemplary script topics 520 comprise an exemplary target script 530 that allows a user to obtain documentation (e.g., a manual) from node 540 and to execute the documentation by means of node 550.

The exemplary OS commands 560 comprise a particular OS command 570 that includes a manual page node 580 describing how to use the particular operating system command and an execute node 590 for executing the particular operating system command.

In one or more embodiments, the sub-topics structure shown in FIG. 5 can be a list or a tree (e.g., a sequence of choices). The human user (e.g., the support person 130) selects a main topic and then moves through the supported states.

Figure 6:
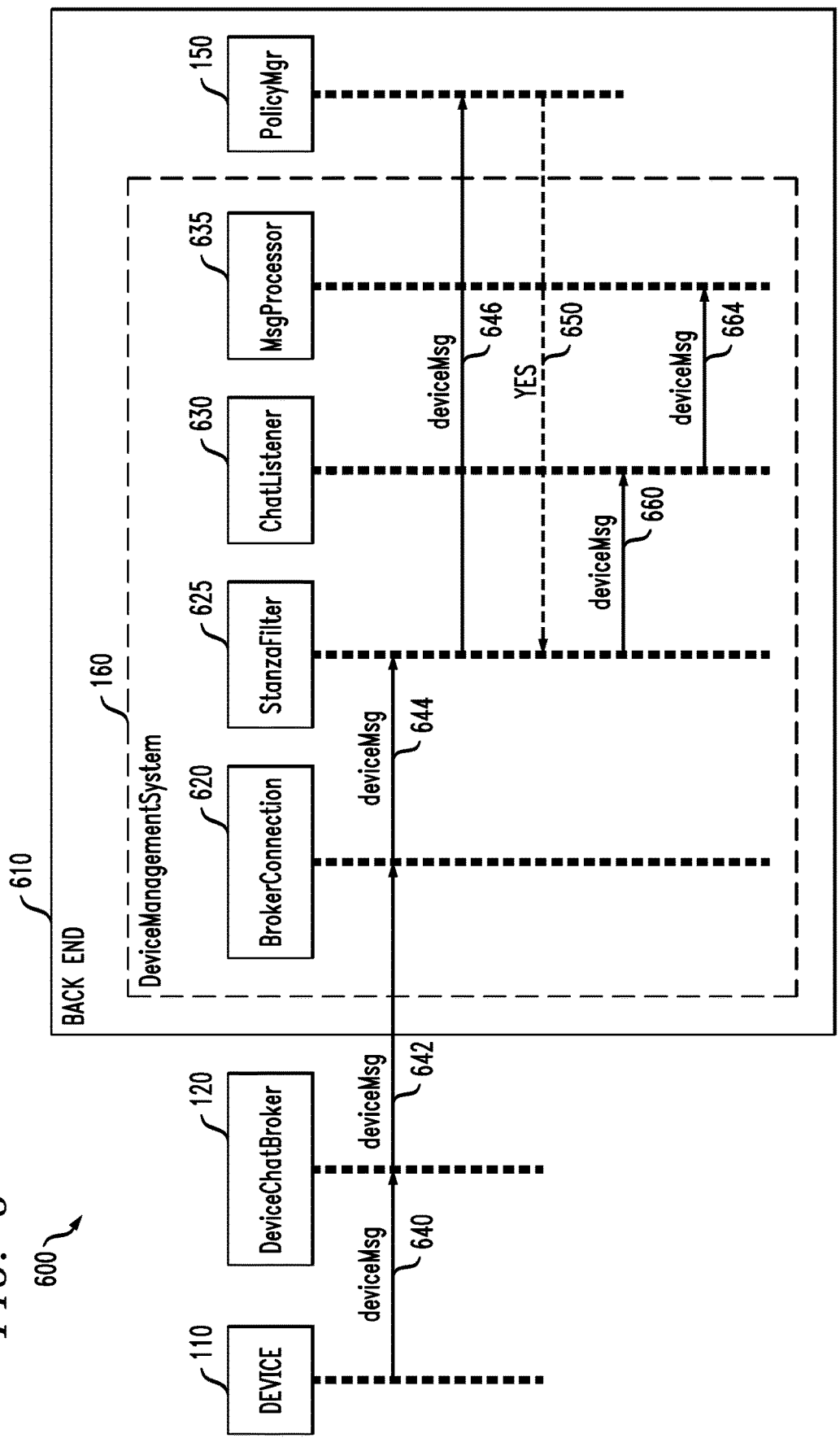
FIG. 6 is an exemplary communications diagram for a policy management process, according to some embodiments.

FIG. 6 is an exemplary communications diagram 600 for a policy management process, according to some embodiments. In one or more embodiments, each attempt to send a message is filtered through the policy manager 150 that either allows or prohibits particular messages. Generally, the exemplary policy manager 150 filters chat messages based on one or more predefined filtering rules that constrain messages to allow or disallow each message. In this manner, a particular chat request is granted only if the specified policy permits the message.

As shown in FIG. 6, a particular device 110 sends a device message 640 to the device chat broker 120, which forwards the device message 642 to a broker connection 620 in a backend 610, for example, of an enterprise environment. The broker connection 620 then forwards the device message 644 to a stanza filter 625, which then intercepts the message and forwards the intercepted device message 646 to the policy manager 150. Generally, Stanza Interception and Filtering Technology (SIFT) is specified as part of the exemplary XMPP protocol (other filtering techniques can be employed in different implementations, as would be apparent to a person of ordinary skill in the art).

The policy manager 150 evaluates one or more policy rules to determine if the original message 640 should be allowed. In the example of FIG. 6, allows the message and sends a "yes" message 650 to the stanza filter 625. The stanza filter 625 forwards the original device message 644 that it received to a chat listener 630 as a forwarded message 660. The chat listener 630 then forwards the message 664 to a message processor 635 that will send the message to the recipient device.

Among other benefits, the policy implementation set forth in FIG. 6 isolates the routing of the message from the processing of message. The use of device chat for management of devices reduces the costs and inefficiencies associated with existing device management techniques.

In some embodiments, an open source chat framework is employed for improved device management and device chat for device-to-device communications, people-to-device remote chat communications, and device management system-to-device communications. The disclosed device chat framework optionally provides security and policy enforcement for filtering of messages over the open source middleware.

In one or more embodiments, the disclosed device chat framework improves interactions between devices, such as IoT sensors, for improved IoT communications and response times.

One or more embodiments of the disclosure provide improved methods and apparatus for device management and chat. The foregoing applications and associated embodiments should be considered as illustrative only, and numerous other embodiments can be configured using the techniques disclosed herein, in a wide variety of different applications.

It should also be understood that the disclosed device management and chat techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for device management and chat may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-as-Service (PaaS) offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components of the exemplary device chat environment 100 are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a device chat platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
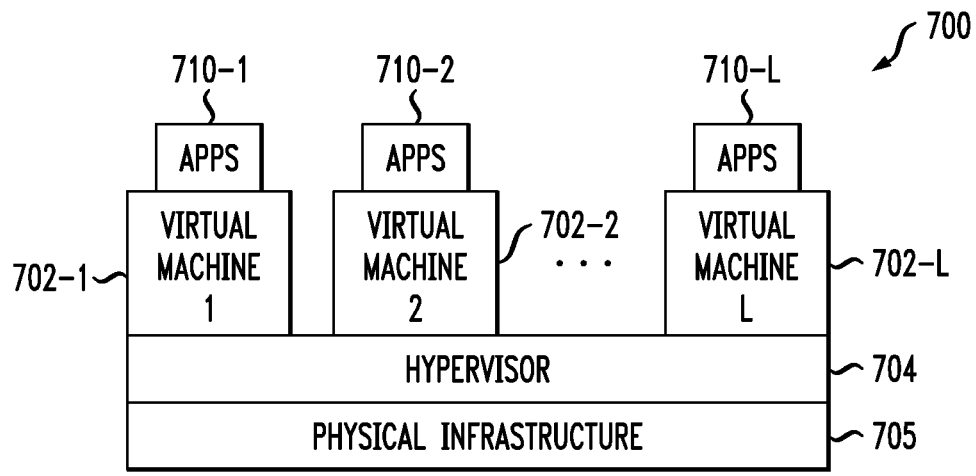
FIG. 7 illustrates an exemplary processing platform that may be used to implement at least a portion of one or more embodiments of the disclosure comprising a cloud infrastructure.

Referring now to FIG. 7, one possible processing platform that may be used to implement at least a portion of one or more embodiments of the disclosure comprises cloud infrastructure 700. The cloud infrastructure 700 in this exemplary processing platform comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

The cloud infrastructure 700 may encompass the entire given system or only portions of that given system, such as one or more of client, servers, controllers, or computing devices in the system.

Although only a single hypervisor 704 is shown in the embodiment of FIG. 7, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 704 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the exemplary device chat environment 100 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed device chat apparatus may each run on a computer, server, storage device or other processing platform element. A given such element may be viewed as an example of what is more generally referred to herein as a "processing device." The cloud infrastructure 700 shown in FIG. 7 may represent at least a portion of one processing platform.

Figure 8:
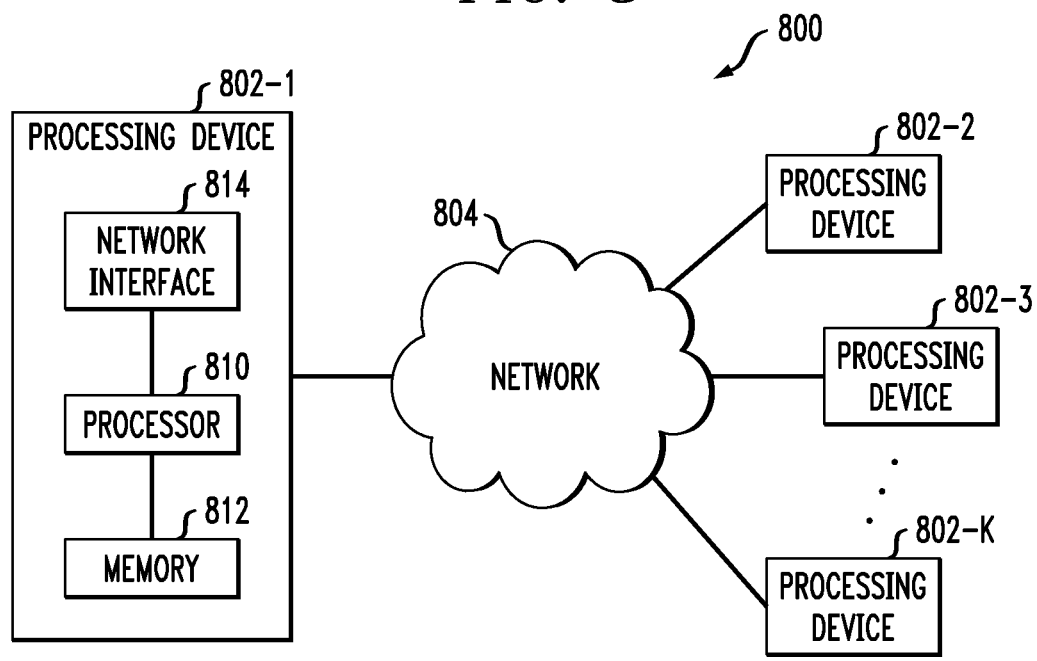
FIG. 8 illustrates another exemplary processing platform that may be used to implement at least a portion of one or more embodiments of the disclosure.

Another example of a processing platform is processing platform 800 shown in FIG. 8. The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 2, 4 and 6 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a first message at a device chat broker for registering a particular device type with a device type repository, wherein the device type repository stores one or more attributes of the particular device type;
providing, by said device chat broker, a second message to register at least one device of the particular device type with the device management system to enable communications between the at least one device and the device management system using a person-to-person chat framework;
obtaining a third message at said device chat broker from the device management system for management of a state of said at least one device using said person-to-person chat framework, wherein the third message is based at least in part on the one or more attributes of the particular device type; and
providing, by said device chat broker, said third message to said at least one device to manage said state.

2. The method of claim 1, further comprising the step of adding said at least one device to at least one device group used to broadcast one or more management messages to a plurality of devices in the at least one device group.

3. The method of claim 2, wherein the plurality of devices in the at least one device group have one or more of shared device attributes; a shared location; a shared enterprise affiliation; and a shared ownership.

4. The method of claim 1, further comprising the step of monitoring an online status of said at least one device.

5. The method of claim 1, further comprising the step of filtering one or more messages based on at least one predefined policy.

6. The method of claim 1, wherein said at least one device communicates with at least one person using said person-to-person chat framework based on a remote session attribute.

7. The method of claim 6, wherein said remote session attribute comprises one or more of at least one associated predefined conversation and at least one sequence of predefined question and answer pairs for a given predefined conversation.

8. The method of claim 1, wherein registering the at least one device with the device management system comprises adding the at least one device to a contact list corresponding to the device management system in the person-to-person chat framework.

9. The method of claim 1, further comprising the step of obtaining, by the message broker, a fourth message comprising at least a security key and an address corresponding to the device management system to be used for communications between the device and the device management system.

10. The method of claim 1, wherein the device type repository enables a plurality of devices of the same device type to be automatically registered with the device manager.

11. A system for communication among a plurality of devices, comprising:
a memory; and
at least one processing device, coupled to the memory, operative to implement the following steps:
obtaining a first message at a device chat broker for registering a particular device type with a device type repository, wherein the device type repository stores one or more attributes of the particular device type;
providing, by said device chat broker, a second message to register at least one device of the particular device type with the device management system to enable communications between the at least one device and the device management system using a person-to-person chat framework;
obtaining a third message at said device chat broker for management of a state of said at least one device using said person-to-person chat framework, wherein the third message is based at least in part on the one or more attributes of the particular device type; and providing, by said device chat broker, said third message to said at least one device to manage said state.

12. The system of claim 11, further comprising the step of adding said at least one device to at least one device group used to broadcast one or more management messages to a plurality of devices in the at least one device group.

13. The system of claim 11, further comprising the step of monitoring an online status of said at least one device.

14. The system of claim 11, further comprising the step of filtering one or more messages based on at least one predefined policy.

15. The system of claim 11, wherein said at least one recipient device communicates with at least one person using said person-to-person chat framework based on a remote session attribute.

16. A computer program product for communication among a plurality of devices, comprising a non-transitory machine-readable storage medium having encoded therein executable code of one or more software programs, wherein the one or more software programs when executed by at least one processing device perform the following steps:

obtaining a first message at a device chat broker for registering a particular device type with a device type repository, wherein the device type repository stores one or more attributes of the particular device type;

providing, by said device chat broker, a second message to register at least one device of the particular device type with the device management system to enable communications between the at least one device and the device management system using a person-to-person chat framework;

obtaining a third message at said device chat broker from the device management system for management of a state of said at least one device using said person-to-person chat framework, wherein the third message is based at least in part on the one or more attributes of the particular device type; and providing, by said device chat broker, said third message to said at least one device to manage said state.

17. The computer program product of claim 16, further comprising the step of adding said at least one device to at least one device group used to broadcast one or more management messages to a plurality of devices in the at least one device group.

18. The computer program product of claim 16, further comprising the step of monitoring an online status of said at least one device.

19. The computer program product of claim 16, further comprising the step of filtering one or more messages based on at least one predefined policy.

20. The computer program product of claim 16, wherein said at least one device communicates with at least one person using said person-to-person chat framework based on a remote session attribute.

* * * * *